(12) United States Patent
Noda

(10) Patent No.: US 7,971,570 B2
(45) Date of Patent: Jul. 5, 2011

(54) ENGINE CONTROLLER

(75) Inventor: Yoshihiro Noda, Ichinomiya (JP)

(73) Assignee: Denso Corporation, Kariya (JP)

( * ) Notice: Subject to any disclaimer, the term of this patent is extended or adjusted under 35 U.S.C. 154(b) by 355 days.

(21) Appl. No.: 12/123,533

(22) Filed: May 20, 2008

(65) Prior Publication Data
US 2008/0294329 A1 Nov. 27, 2008

(30) Foreign Application Priority Data

May 23, 2007 (JP) .................................. 2007-136833

(51) Int. Cl.
F02D 41/00 (2006.01)
(52) U.S. Cl. .................................. 123/339.15; 123/690
(58) Field of Classification Search .................. 123/672, 123/339.15, 350, 351, 690, 703
See application file for complete search history.

(56) References Cited

U.S. PATENT DOCUMENTS

| | | | |
|---|---|---|---|
| 3,998,095 A * | 12/1976 | Tinkham et al. | 73/114.71 |
| 5,199,397 A | 4/1993 | Shelef et al. | |
| 5,916,294 A * | 6/1999 | Naber et al. | 701/109 |
| 5,941,928 A * | 8/1999 | Naber et al. | 701/109 |
| 6,358,180 B1 | 3/2002 | Kuroda et al. | |
| 6,363,906 B1 | 4/2002 | Thompson et al. | |
| 6,397,583 B1 * | 6/2002 | Davey et al. | 60/277 |
| 6,595,180 B2 | 7/2003 | Thompson et al. | |
| 2005/0043868 A1 * | 2/2005 | Mitcham | 701/29 |
| 2005/0262827 A1 | 12/2005 | Ichimoto et al. | |
| 2006/0150937 A1 | 7/2006 | Lupo et al. | |
| 2008/0103684 A1 * | 5/2008 | Allmer et al. | 701/114 |
| 2008/0154671 A1 * | 6/2008 | Delk | 705/7 |

FOREIGN PATENT DOCUMENTS

| | | |
|---|---|---|
| EP | 1 674 720 | 6/2006 |
| FR | 2 883 035 | 9/2006 |
| GB | 2 390 438 | 1/2004 |
| JP | 11-044230 | 2/1999 |
| JP | 2000-257498 | 9/2000 |
| JP | 2001-055942 | 2/2001 |
| JP | 2005-127207 | 5/2005 |
| JP | 2006-329122 | 12/2006 |
| JP | 2007-009887 | 1/2007 |

OTHER PUBLICATIONS

Japanese Office Action dated May 12, 2009, issued in corresponding Japanese Application No. 2007-136833, with English translation.
Extended European Search Report dated Oct. 11, 2010, issued in corresponding European Application No. 08009424.6-1263.
Search Report (4 pgs.) dated Apr. 26, 2011 issued in a corresponding European Application No. 08 009 424.6-1263.

* cited by examiner

Primary Examiner — John T Kwon
(74) Attorney, Agent, or Firm — Nixon & Vanderhye P.C.

(57) ABSTRACT

An engine controller for a vehicle equipped with an emission reduction apparatus determines whether the emission reduction apparatus has malfunction. When it is determined that the emission reduction apparatus has malfunction an execution of an idle shutdown control process is permitted. When a predetermined condition is established during an engine idling, the engine is automatically shut down. On the other hand, when it is determined that the emission reduction apparatus has no malfunction, the execution of the idle shutdown control process is prohibited.

10 Claims, 5 Drawing Sheets

ENGINE CONTROLLER

CROSS-REFERENCE TO RELATED APPLICATION

This application is based on Japanese Patent Application No. 2007-136833 filed on May 23, 2007, the disclosure of which is incorporated herein by reference.

FIELD OF THE INVENTION

The present invention relates to a controller which controls an engine for a vehicle. Especially the controller automatically shuts down the engine during idling. BACKGROUND OF THE INVENTION As shown in JP-2003-526045A (U.S. Pat. No. 6,363,906B1), it is known that an engine for a vehicle is automatically shut down in order to reduce emission if the engine idling condition continues for a specified time. This operation is called as an idle shutdown.

As a regulation regarding to the idle shutdown, the California Air Resources Board (CARB) establishes Final Regulation Order: Requirement to Reduce Idling Emissions From New and In-Use Trucks, Beginning in 2008.

This regulation requires that all 2008 and subsequent model year engines for the North America are equipped with the idle shutdown function. While an emission reduction apparatus is regenerated or the vehicle is under the maintenance, a time period until the shutdown can be prolonged.

According to this regulation, when a power take-off (PTO) device is operated or an engine coolant temperature is lower than 60° F., it is unnecessary to perform the idle shutdown. Further, it is unnecessary to perform the idle shutdown for emergency vehicles, military vehicles, vehicles which is authorized that NOx emission is less than a specified value, and vehicles equipped with an idle emission reduction apparatus.

The PTO device is operated in order to take off an engine power for driving an operating machine. While the PTO device is operated, the engine is at idle.

The vehicle which is authorized that its NOx emission is less than the specified value, and the vehicle which is equipped with the idle emission reduction apparatus are referred to as idle-shutdown free vehicles hereinafter. Since such idle-shutdown free vehicles are able to reduce specified materials in exhaust gas, it is unnecessary to perform the idle shutdown.

However, even in the idle-shutdown free vehicles, if the emission reduction apparatus is not operated normally, the exhaust gas is not purified enough. The emission reduction apparatus includes, for example, an Exhaust Gas Recirculation (EGR) apparatus and a Diesel Particulate Filter (DPF) for reducing particulate matters in the exhaust gas.

SUMMARY OF THE INVENTION

The present invention is made in view of the above matters, and it is an object of the present invention to provide an engine controller which is capable of restraining atmospheric pollution due to the exhaust gas from the engine while execution frequency of idle shutdown is maintained minimum.

According to the present invention, an engine controller is mounted on a vehicle equipped with an emission reduction apparatus which reduces a specified material in exhaust gas discharged from an engine. The engine controller includes an idle shutdown control means which shuts down the engine at idle when a specified condition is established, a determination means which determines whether the emission reduction apparatus has malfunction. The engine controller further includes a switching means which prohibits the idle shutdown control means from shutting down the engine when the determination means determines the emission reduction apparatus has no malfunction. The switching means permits the idle shutdown control means to shut down the engine when the determination means determines the emission reduction apparatus has malfunction.

Hence, only when the emission reduction apparatus has malfunction and NOx and the particulate matters in the exhaust gas are deemed to increase, the idle shutdown control process is executed, whereby the execution frequency of the idle shutdown is maintained minimum while atmospheric pollution due to the exhaust gas is restrained. Furthermore, even in the idle-shutdown free vehicle, if the emission reduction apparatus has malfunction, the idle shutdown is performed to shut down the engine so that it is prevented that unpurified exhaust gas is discharged to the atmosphere.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter. In this embodiment, the engine controller controls a diesel engine.

[Explanation of Hardware]

Figure 1:
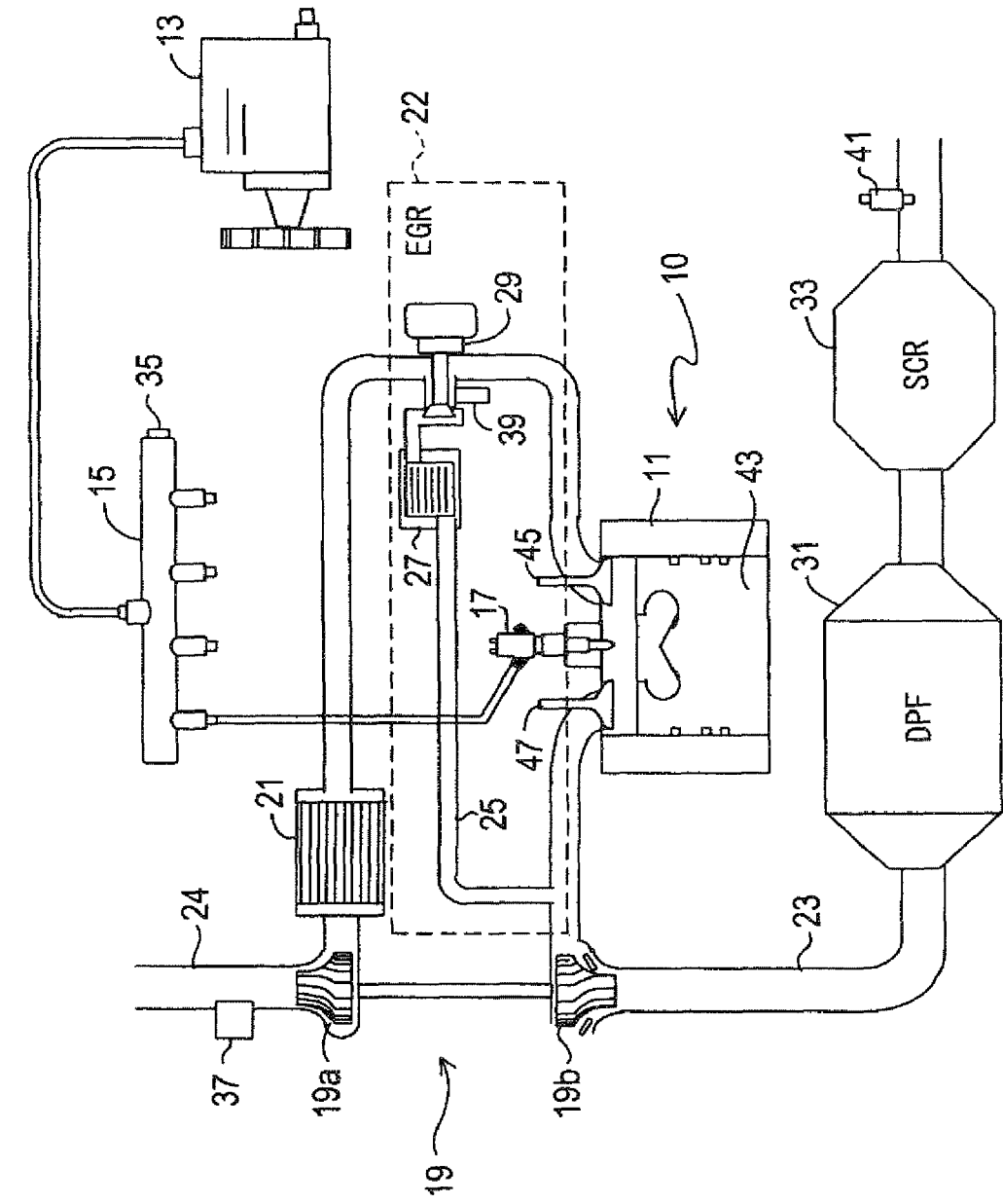
FIG. 1 is schematic view showing an engine control system.

FIG. 1 shows a diesel engine 10 and other devices around the engine 10. An electronic control unit (ECU: not shown) controls the engine 10.

A high-pressure fuel pump 13 supplies high-pressure fuel into a common rail 15. The fuel is introduced to an injector 17. When the injector 17 is energized, the fuel is injected to a cylinder 11.

The engine 10 is provided with a turbocharger 19. The turbocharger includes a turbine 19b in an exhaust pipe 23 and a compressor 19a in an intake pipe 24. Fresh air compressed by the compressor 19a is cooled by the inter-cooler 21 and then introduced into the cylinder 11. An EGR system 22 introduces a part of exhaust gas into the cylinder 11.

The EGR system 22 includes an EGR pipe 25, an EGR cooler 27, and an EGR valve 29. The EGR pipe 25 connects upstream of the turbine 19b and downstream of the inter-cooler 21. The EGR valve 29 is provided in the EGR pipe 25. When the EGR valve 29 is opened, a part of the exhaust gas is introduced into a cylinder 11 through the EGR cooler 27.

A diesel particulate filter (DPF) 31 is provided downstream of the turbine 19b in order to reduce particulate matters in the exhaust gas. A selective catalytic reduction (SCR) system 33 is provided downstream of the DPF 31 to reduce NOx amount in the exhaust gas. In the SCR system 33, urea aqueous solution is injected into the exhaust gas to generate ammonia which resolves NOx in the exhaust gas into N2 and H2O.

A common rail pressure sensor 35 is provided in the common rail 15 in order to detect pressure in the common rail 15. An air flow meter 37 is provided upstream of the compressor 19a to detect intake air flow rate.

The EGR valve 29 is provided with an EGR valve position sensor 39 which detect an opening degree of the EGR valve 29. A NOx sensor 41 detecting NOx in the exhaust gas is provided downstream of the SCR system 33 in the exhaust pipe 23.

A piston 43 reciprocates in the cylinder 11. The cylinder 11 is provided with an intake valve 45 and an exhaust valve 47.

Figure 2:
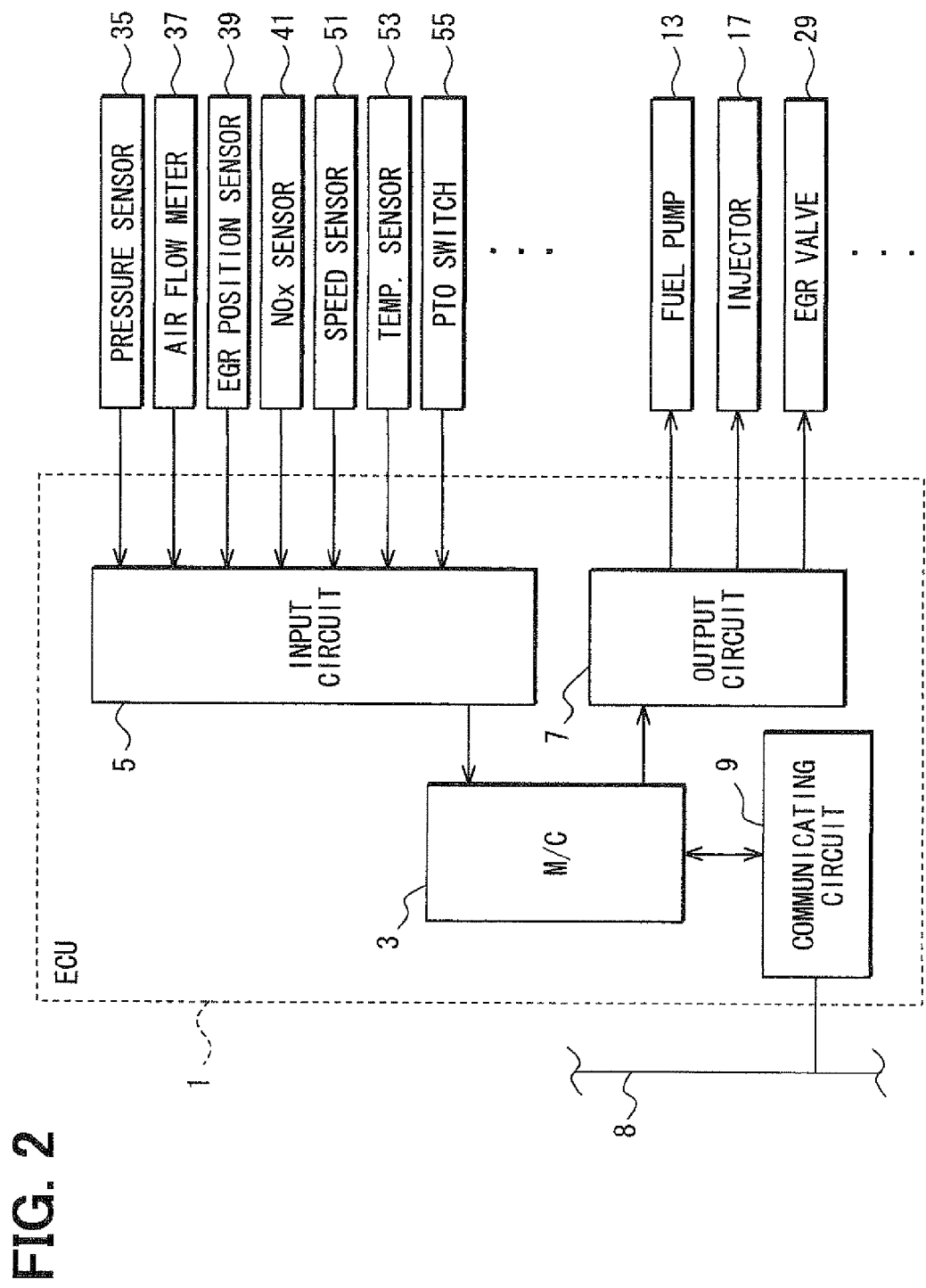
FIG. 2 is a block diagram showing an electronic control unit (ECU)

FIG. 2 shows the ECU 1 which includes a microcomputer 3, an input circuit 5, and an output circuit 7. The microcomputer 3 receives signals through the input circuit 5 from the common rail pressure sensor 35, the air flow meter 37, the EGR valve position sensor 39, the NOx sensor 41, an engine speed sensor 51, a coolant temperature sensor 53, a PTO switch 55 and the like.

The microcomputer 3 outputs driving signals through the output circuit 7 toward actuators of the high-pressure pump 13, the injector 17, the EGR valve 29 and the like.

The microcomputer 3 calculates control command based on the received signals and outputs them to the engine 10 and other devices through the output circuit 7.

For example, the microcomputer 3 controls the high-pressure pump 13 in such a manner that the pressure detected by the pressure sensor 35 becomes a target pressure. The microcomputer 3 drives the injector 17 in order to obtain appropriate fuel injection quantity and fuel injection timing. The microcomputer 3 controls the opening degree of the EGR valve 29 based on the engine speed and the like. The microcomputer 3 energizes a heater (not shown) for regenerating the DPF 31 when it is determined that a specified amount of particulate matters are captured by the DPF 31 based on a differential pressure sensor (not shown) provided between upstream and downstream of the DPF 31. Further, the microcomputer 3 drives an actuator of the SCR system 33 based on NOx concentration detected by the NOx sensor 41.

The ECU 1 is provided with a communication circuit 9 for communicating with other device through a communication line 8.

[Explanation of Process]

The microcomputer of the ECU 1 performs various processes, which will be described hereinafter.

FIRST EMBODIMENT

The ECU 1 is mounted on the idle-shutdown free vehicles other than the emergency vehicles and the military vehicles.

Figure 3:
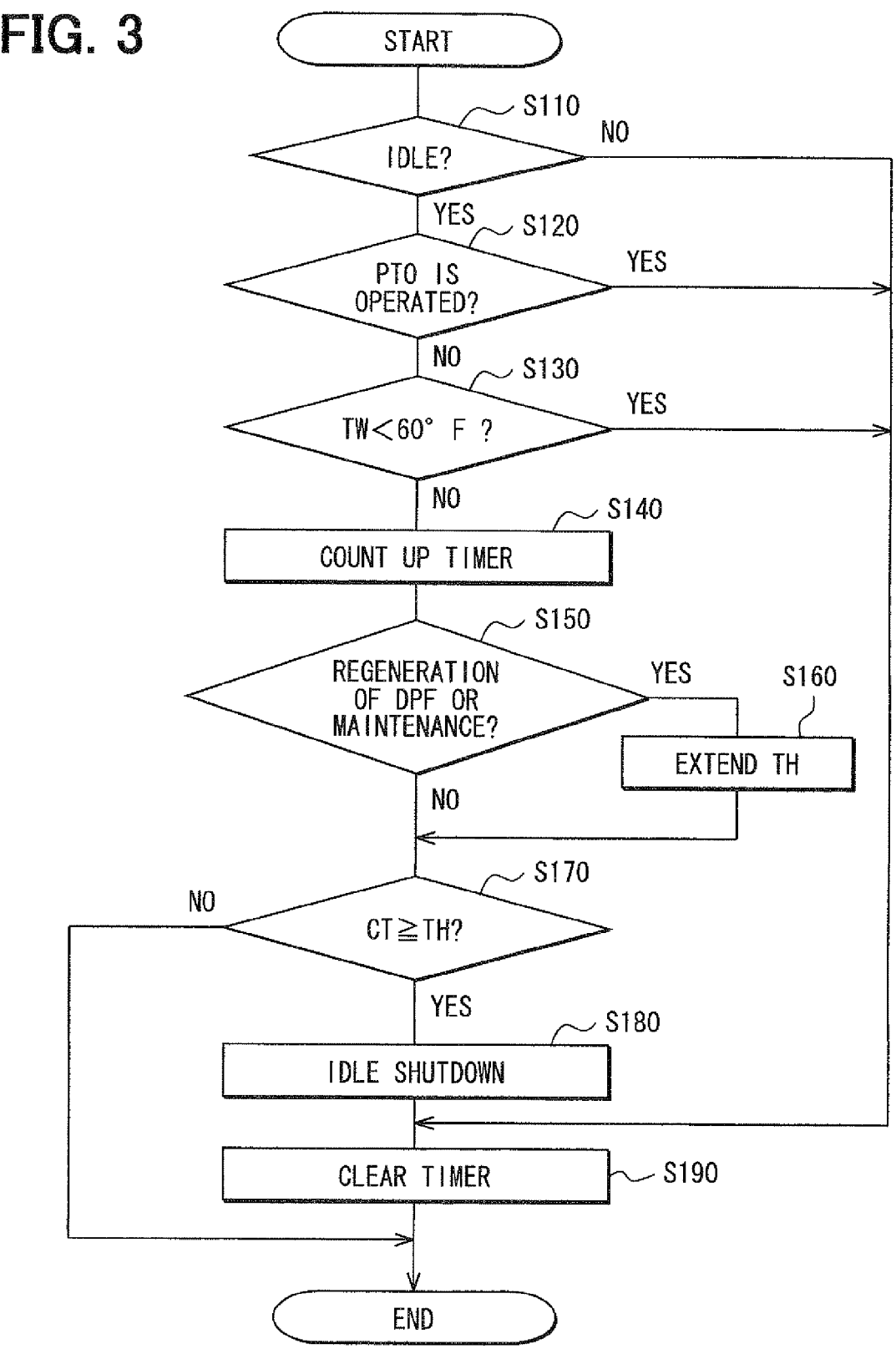
FIG. 3 is a flowchart showing an idle shutdown control process according to a first embodiment.

FIG. 3 is a flowchart showing an idle shutdown control process. When the engine is at idle and a predetermined condition is established, the engine 10 is automatically shut down. This process is performed at regular time intervals when the microcomputer 3 allows in S240 in FIG. 4, which will be described later.

In S110, it is determined whether the engine 10 is at idle. When the answer is Yes, the procedure proceeds to S120 in which it is determined whether the PTO device is operated. When the answer is No, the procedure proceeds to S130 in which it is determined whether the engine coolant temperature Tw is lower than 60° F. When the answer is No, the procedure proceeds to S140 in which a shutdown timer counts up to measure duration of engine idle. Based on On/Off state of the PTO switch 55, it is determined whether the PTO device is operated. Based on the signal from the coolant temperature sensor 53, the coolant temperature is calculated.

In S150, it is determined whether the DPF 31 is being regenerated or the vehicle is under the maintenance. When the answer is No, the procedure proceeds to S170 in which it is determined whether the count value CT of the shutdown timer is greater than a threshold time period TH. When the communication circuit 9 receives the signal indicative of malfunction of the vehicle, it is determined that the vehicle is under the maintenance.

When the answer is No in S170, the idle shutdown control process is terminated. When the answer is Yes in S170, the procedure proceeds to S180 in which the idle shutdown is performed. Specifically, the fuel injection is stopped to shut down the engine 10. Then, the procedure proceeds to S190 in which count value of the shutdown timer is cleared to "0", and the idle shutdown control process ends.

When the answer is No in S110, the answer is Yes in S120, or the answer is Yes in S130, the procedure proceeds to S190.

When the answer is Yes in S150, the procedure proceeds to S160 in which the threshold time period TH is extended. Specifically, when the DPF 31 is being regenerated, the threshold time period is extended by a first extension time, for example, 30 minutes. When the vehicle is under the maintenance, the threshold time period TH is extended by a second extension time, for example, 60 minutes.

As described above, in the idle shutdown control process, when the engine is at idle, the PTO device is not operated, the coolant temperature Tw is not lower than 60° F., and the duration of engine idling exceeds the threshold time period TH, the fuel injection is stopped to shut down the engine 10.

Figure 4:
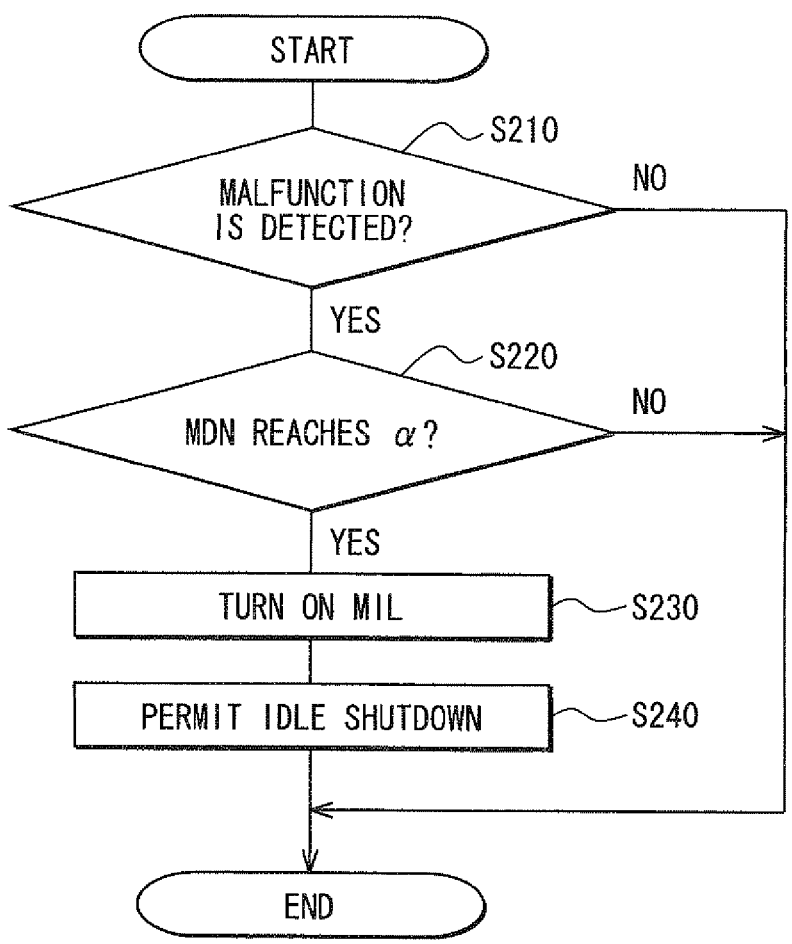
FIG. 4 is a flowchart showing an idle shutdown determination process according to the first embodiment.

FIG. 4 is a flowchart showing an idle shutdown determination process in which it is determined whether the idle shutdown control process should be performed. This idle shutdown determination process is performed at regular time intervals.

In S210, it is determined whether the emission reduction apparatus has malfunction. In this embodiment, the emission reduction apparatus includes the EGR system 22, the DPF 31, and the SCR system 33.

In S210, the microcomputer 3 detects malfunction, deterioration, or remove of the components of the emission reduction apparatus. For example, following malfunction events (1)-(6) are detected.

(1) Detection of the NOx Sensor Malfunction

The microcomputer determines whether output value (output voltage) of the NOx sensor 41 is within a predetermined range. If the output value is outside of the predetermined range, it is determined that the NOx sensor 41 has malfunction.

(2) Detection of the NOx Sensor Deterioration

The output value of the NOx sensor 41 has a correlation with the engine drive condition. The output value of the NOx sensor 41 is compared with an estimated value of the output value which is based on the current engine drive condition. If there is a difference between the output value and the estimated value by a specified value or more, it is determined that NOx sensor 41 is deteriorated.

(3) Detection of the NOx Sensor Remove

The output of the NOx sensor 41 is monitored. If the output is fixed at a specified voltage, it is determined that the NOx sensor 41 is removed.

(4) Detection of the EGR System Malfunction

It is determined whether the output value (output voltage) of the valve position sensor 39 is within a specified range. If the output value is outside of the specified range, it is determined that the EGR system 22 has malfunction.

(5) Detection of the EGR System Deterioration

The intake air flow rate can be estimated based on the engine speed, and the EGR amount (amount of exhaust gas introduced into the intake pipe) can be estimated based on the opening degree of the EGR valve 29. Hence the actual air flow rate introduced into the engine 10 can be estimated based on the current engine speed and the opening degree of the EGR valve 29. This estimated air flow rate is compared with the intake air flow rate detected by the air flow meter 37. If the difference between the estimated air flow rate and the detected air flow rate is larger than a predetermined value, it is determined that the EGR system 22 is deteriorated.

(6) Detection of the EGR cooler Deterioration

If a difference between outputs of the temperature sensors (not shown) disposed upstream and downstream of the EGR cooler 27 is not more than a specified value, it is determined that the EGR cooler 27 is deteriorated.

As the other malfunction event, if the pressure drop in the DPF 31 is larger than a specified value even after the DPF 31 is regenerated, it is determined that the generation device (heater) for the DPR 31 has malfunction.

When the malfunction event is detected in S210, the procedure proceeds to S220 in which it is determined whether the malfunction detection number MDN reaches a predetermined number $\alpha$. When the answer is Yes in S220, the microcomputer 3 confirms that malfunction occurs in the emission reduction apparatus. Then, the procedure proceeds to S 230. The predetermined number $\alpha$ is arbitrarily established. In this embodiment, the predetermined number $\alpha$ is "2".

In S230, a malfunction indicating lump (MIL: not shown) is turned on. The MIL is provided on an instrument panel of the vehicle.

Then, the procedure proceeds to S240 in which the execution of the idle shutdown control process (FIG. 3) is permitted. When the answer is No in S210 or S220, the execution of the idle shutdown control process is not permitted.

As described above, when it is determined that the emission reduction apparatus has no malfunction, the idle shutdown control process is prohibited to avoid the engine shutdown. When the emission reduction apparatus has malfunction, it is permitted to execute the idle shutdown control process.

According to the first embodiment, only when the emission reduction apparatus has malfunction and NOx and the particulate matters in the exhaust gas are deemed to increase, the idle shutdown control process is executed so that the execution frequency of the idle shutdown is maintained minimum while atmospheric pollution due to the exhaust gas is restrained. Furthermore, even in the idle-shutdown free vehicle, if the emission reduction apparatus has malfunction, the idle shutdown is performed to shut down the engine so that it is prevented that unpurified exhaust gas is discharged to the atmosphere.

When it is determined that the emission reduction apparatus has malfunction, the MIL is turned on, so that the user of the vehicle is notified that the malfunction occurs and idle shutdown will be performed.

As a modification of the idle shutdown determination process shown in FIG. 4, when the answer is No in S210 or S220, the execution of the process only in S180 may be prohibited. The other processes in S110-S170 are executed.

Figure 5:
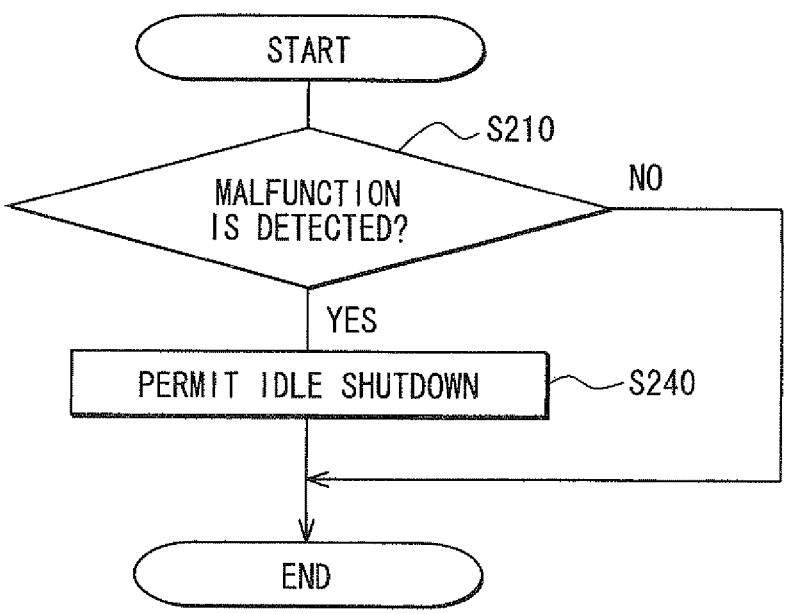
FIG. 5 is a flowchart showing an idle shutdown determination process according to a modification of the first embodiment.

The idle shutdown determination process shown in FIG. 4 can be replaced by a process shown in FIG. 5. When the malfunction event is detected in S210, the procedure proceeds to S240 to permit the execution of the idle shutdown control process.

SECOND EMBODIMENT

The ECU 1 is mounted on the vehicle which is required to perform the idle shutdown.

Figure 6:
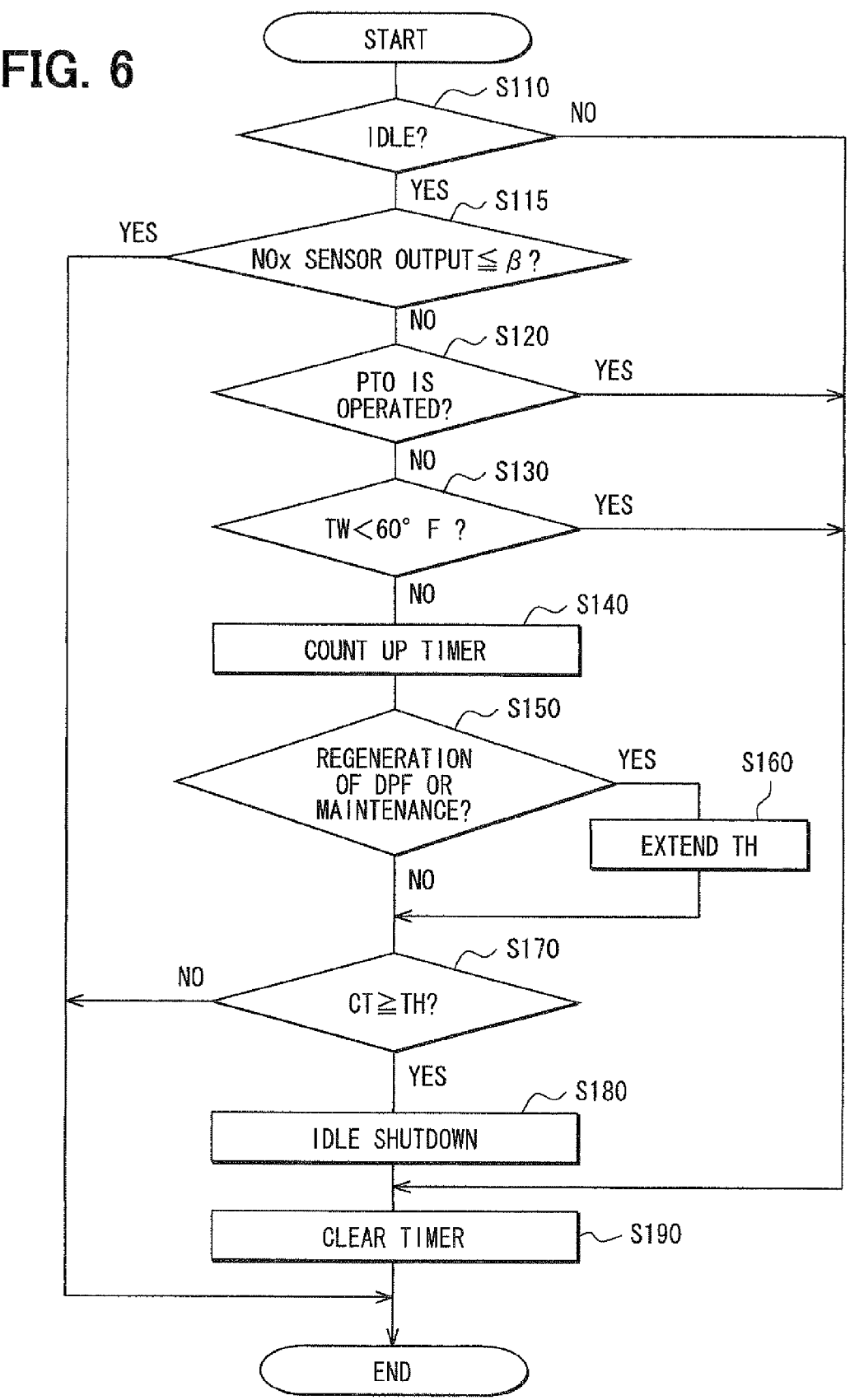
FIG. 6 is a flowchart showing an idle shutdown control process according to a second embodiment.

Comparing with the first embodiment, the process shown in FIG. 4 is not executed and the process shown in FIG. 3 is replaced by the process shown in FIG. 6.

As shown in FIG. 6, when it is determined that the engine 10 is at idle in S110, the procedure proceeds to S115 in which it is determined whether the output value of the NOx sensor 41 is not more than a specified value $\beta$. When the output value is not more than the specified value $\beta$, the procedure ends without executing the idle shutdown.

When the output value of the NOx sensor 41 is not more than the specified value $\beta$, the amount of NOx in the exhaust gas is small.

According to the second embodiment, the same advantages as the first embodiment can be obtained.

The present invention should not be limited to the disclosed embodiment, but may be implemented in other ways without departing from the sprits of the invention.

In the first embodiment, regarding to only one of the NOx reducing system and the particulate reducing system, it may be determined whether malfunction occurs therein.

The emission reduction apparatus includes another system other than the EGR system 22, the DPF 31, and the SCR system 33.

The present invention can be applied to vehicles used in a region where the Regulation Order is not effective.

The present invention can be applied to a gasoline engine.

What is claimed is:

1. An engine controller for a vehicle equipped with an emission reduction apparatus which reduces a specified material in exhaust gas discharged from an engine, the engine controller comprising:
   an idle shutdown control means for shutting down the engine at idle when a specified condition is established;
   a determination means for determining whether the emission reduction apparatus has malfunction; and
   a switching means for prohibiting the idle shutdown control means from shutting down the engine when the determination means determines the emission reduction apparatus has no malfunction, and for permitting the idle shutdown control means to shut down the engine when the determination means determines the emission reduction apparatus has malfunction.

2. An engine controller according to claim 1, wherein
   the determination means finally determines that the emission reduction apparatus has malfunction when a plurality of malfunctions are detected in the emission reduction apparatus.

3. An engine controller according to claim 1, wherein
   the determination means turns on a warning indicator when it is determined that the emission reduction apparatus has malfunction, and
   the switching means for prohibiting the idle shutdown control means from shutting down the engine when the warning indicator is not turned on, and for permitting the idle shutdown control means to shut down the engine when the warning indicator is turned on.

4. An engine controller according to claim 1, wherein the switching means prohibits an operation of the idle shutdown control means to prevent the idle shutdown control means from shutting down the engine, and permits an operation of the idle shutdown control means to shut down the engine.

5. An engine controller according to claim 1, wherein the emission reduction apparatus includes one or more of: an exhaust gas recirculation apparatus, a diesel particulate filter or a selective catalytic reduction system.

6. A method of controlling an engine of a vehicle equipped with an emission reduction apparatus which reduces a specified material in exhaust gas discharged from the engine, the method comprising:
   controlling a shutting down of the engine at idle when a specified condition is established;
   determining whether the emission reduction apparatus has malfunction;
   prohibiting the shutting down of the engine when said determining determines that the emission reduction apparatus has no malfunction; and
   permitting the shutting down of the engine when said determining determines that the emission reduction apparatus has malfunction.

7. The method of claim 6, wherein
   said determining finally determines that the emission reduction apparatus has malfunction when a plurality of malfunctions are detected in the emission reduction apparatus.

8. The method of claim 6, further comprising:
   turning on a warning indicator when it is determined that the emission reduction apparatus has malfunction;
   prohibiting the shutting down of the engine when the warning indicator is not turned on; and
   permitting shutting down of the engine when the warning indicator is turned on.

9. The method of claim 6, wherein
   said shutting down of the engine includes prohibiting an operation of a controller to prevent the controller from shutting down the engine; and
   said permitting the shutting down of the engine includes permitting an operation of the controller to shut down the engine.

10. The method of claim 6, wherein the emission reduction apparatus includes one or more of: an exhaust gas recirculation apparatus, a diesel particulate filter or a selective catalytic reduction system.

* * * * *